(12) United States Patent
Ko et al.

(10) Patent No.: US 12,535,404 B2
(45) Date of Patent: Jan. 27, 2026

(54) QUANTUM IMAGING DEVICE CAPABLE OF OPERATING WITH SINGLE-PIXEL DETECTORS

(71) Applicant: ELECTRONICS AND TELECOMMUNICATIONS RESEARCH INSTITUTE, Daejeon (KR)

(72) Inventors: Young-Ho Ko, Daejeon (KR); Chungheon Baek, Daejeon (KR); Hye Min Kim, Daejeon (KR); Mireu Lee, Daejeon (KR); Hyunhee Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 133 days.

(21) Appl. No.: 18/513,059

(22) Filed: Nov. 17, 2023

(65) Prior Publication Data
US 2024/0167938 A1    May 23, 2024

(30) Foreign Application Priority Data

Nov. 21, 2022  (KR) .......................... 10-2022-0156637
Nov. 14, 2023  (KR) .......................... 10-2023-0157722

(51) Int. Cl.
*G01N 21/01*    (2006.01)
(52) U.S. Cl.
CPC .................................... *G01N 21/01* (2013.01)
(58) Field of Classification Search
CPC ............................. G01N 21/01; G01N 21/255
See application file for complete search history.

(56) References Cited

U.S. PATENT DOCUMENTS

| 5,451,785 A | 9/1995 | Faris |
| 5,760,901 A | 6/1998 | Hill |
| 6,108,127 A | 8/2000 | Atkinson |
| 8,811,768 B2 | 8/2014 | Meyers et al. |

(Continued)

FOREIGN PATENT DOCUMENTS

| JP | 2008191122 A | 8/2008 |
| JP | 2021038974 A | 3/2021 |

(Continued)

OTHER PUBLICATIONS

Nigam Samantaray et al., "Realization of the first sub-shot-noise wide field microscope", Light: Science & Applications, vol. 6, pp. 1-7, Jul. 14, 2017.

*Primary Examiner* — Akm Zakaria
(74) *Attorney, Agent, or Firm* — Rabin & Berdo, P.C.

(57) ABSTRACT

Provided is a quantum imaging device. The device includes a first light source configured to generate first light, a first photon pair generation part configured to generate a first entangled photon pair using the first light, a first beam splitter configured to separate the first entangled photon pair into a first signal idler and a first signal line, a first detector configured to receive the first signal idler, a first mirror configured to provide the first signal line to a target, a second detector configured to receive the first signal line transmitted or reflected to the target, and a signal processor connected to the first and second detectors and configured to obtain a target image by comparing a measurement image with a reference image.

19 Claims, 7 Drawing Sheets

(56) References Cited

U.S. PATENT DOCUMENTS

| | | | |
|---|---|---|---|
| 9,952,482 B2* | 4/2018 | Rudolph | G02F 1/3536 |
| 11,493,384 B1 | 11/2022 | Ihn et al. | |
| 2006/0169877 A1* | 8/2006 | Goto | G06N 10/40 |
| | | | 250/225 |
| 2008/0130004 A1 | 6/2008 | Pyo et al. | |
| 2009/0194702 A1* | 8/2009 | Meyers | H04L 9/0858 |
| | | | 356/433 |
| 2022/0303440 A1 | 9/2022 | Song | |
| 2023/0412280 A1* | 12/2023 | Moon | H04B 10/70 |
| 2024/0426021 A1* | 12/2024 | Mauser | C30B 35/002 |

FOREIGN PATENT DOCUMENTS

| | | |
|---|---|---|
| KR | 20010012563 A | 2/2001 |
| KR | 10-2002-0034988 A | 5/2002 |
| KR | 10-2354495 B1 | 1/2022 |
| KR | 10-2384383 B1 | 4/2022 |

* cited by examiner

QUANTUM IMAGING DEVICE CAPABLE OF OPERATING WITH SINGLE-PIXEL DETECTORS

CROSS-REFERENCE TO RELATED APPLICATIONS

This U.S. non-provisional patent application claims priority under 35 U.S.C. § 119 of Korean Patent Application No. 10-2022-0156637, filed on Nov. 21, 2022, and No. 10-2023-0157722, filed on Nov. 14, 2023, the entire contents of which are hereby incorporated by reference.

BACKGROUND

The present disclosure herein relates to an imaging device, and more particularly, to a quantum imaging device capable of operating with single-pixel detectors.

In general, since the clarity of imaging is affected by a signal-to-noise ratio, imaging with higher clarity is possible as a proportion of noise decreases. Typical imaging systems such as microscopes and telescopes use conventional light sources (lamp, light-emitting diode, laser). In the case of using conventional light sources, minimum noise is determined by $1/\sqrt{N}$ (N: quantity of light) that is a standard quantum limit or shot-noise limit. That is, since the signal-to-noise ratio decreases when the quantity of light N decreases, it is very difficult to achieve high clarity at a low quantity of light. Furthermore, it is impossible to physically reduce noise below the shot-noise limit. However, it is known that measurement or imaging using quantum light sources such as entangled photons, correlated photons, or squeezed photons can reduce noise below $1/N$ that is a Heisenberg limit below the shot-noise limit. $\sqrt{N}$-times improved clarity compared to that of conventional imaging may be expected from quantum imaging that is imaging using quantum light sources.

SUMMARY

The present disclosure provides a quantum imaging device capable of increasing productivity.

An embodiment of the inventive concept provides a quantum imaging device including: a first light source configured to generate first light; a first photon pair generation part configured to generate a first entangled photon pair using the first light; a first beam splitter configured to separate the first entangled photon pair into a first signal idler and a first signal line; a first detector configured to receive the first signal idler and generate a reference image; a first mirror configured to provide the first signal line to a target; a second detector configured to receive the first signal line transmitted or reflected to the target and generate a measurement image; and a signal processor connected to the first and second detectors and configured to obtain a target image by comparing the measurement image with the reference image.

In an embodiment, the first photon pair generation part may include a nonlinear crystal plate.

In an embodiment, the quantum imaging device may further include: a first optical fiber between the first beam splitter and the first detector; and a second optical fiber between the first beam splitter and the first mirror.

In an embodiment, the quantum imaging device may further include a second beam splitter between the first mirror and the second detector.

In an embodiment, the quantum imaging device may further include a pinhole lens between the first beam splitter and the first detector.

In an embodiment, the quantum imaging device may further include: a second light source configured to generate second light; and a second photon pair generation part configured to generate a second entangled photon pair using the second light, the second photon pair generation part being thicker than the first photon pair generation part.

In an embodiment, the second photon pair generation part may includes: a first nonlinear crystal plate; and a second nonlinear crystal plate in contact with the first nonlinear crystal plate.

In an embodiment, the quantum imaging device may further include: a third light source configured to generate third light; and a third photon pair generation part configured to generate a third entangled photon pair using the third light, the third photon pair generation part being thicker than the second photon pair generation part.

In an embodiment, the third photon pair generation part may include: a third nonlinear crystal plate; a fourth nonlinear crystal plate spaced apart from the third nonlinear crystal plate; and a birefringent material plate between the third and fourth nonlinear crystal plates.

In an embodiment, the quantum imaging device may further include a dichroic mirror provided between the first beam splitter and the second and third photon pair generation parts, the dichroic mirror reflecting the second entangled photon pair to the first beam splitter and transmitting the third entangled photon pair.

In an embodiment of the inventive concept, a quantum imaging device includes: first and second light sources configured to generate first and second light; a first photon pair generation part configured to generate a first entangled photon pair using the first light; a second photo pair generation part thicker than the first photon pair generation part and configured to generate a second entangled photon pair having a wider band than that of the first entangled photon pair using the second light; a first beam splitter configured to separate the first and second entangled photon pairs into first and second signal idlers and first and second signal lines; a first detector configured to receive the first and second signal idlers and generate a reference image; a first mirror configured to provide the first and second signal lines to a target; a second detector configured to receive the first and second signal lines transmitted or reflected to the target and generate a measurement image; and a signal processor connected to the first and second detectors and configured to obtain a target image by comparing the measurement image with the reference image.

In an embodiment, the first photon pair generation part may include a nonlinear crystal plate.

In an embodiment, the second photon pair generation part may include: a first nonlinear crystal plate having the same thickness as the first photon pair generation part; and a second nonlinear crystal plate in contact with the first nonlinear crystal plate and having the same thickness as the first nonlinear crystal plate.

In an embodiment, the quantum imaging device may further include: a third light source configured to generate third light; and a third photon pair generation part configured to generate a third entangled photon pair having a wider band than that of the second entangled photo pair using the third light.

In an embodiment, the third photon pair generation part may include: a third nonlinear crystal plate having the same thickness as the first photon pair generation part; a fourth nonlinear crystal plate arranged spaced apart from the third nonlinear crystal plate and having the same thickness as the third nonlinear crystal plate; and a birefringent material plate provided between the third and fourth nonlinear crystal plates.

In an embodiment, the quantum imaging device may further include a total reflection mirror provided between the third photon pair generation part and the first beam splitter.

In an embodiment, the quantum imaging device may further include a dichroic mirror, which is provided between the total reflection mirror and the first beam splitter, reflects the second entangled photon pair to the first beam splitter, and transmits the third entangled photon pair to the first beam splitter.

In an embodiment, the first and second detectors each may have a single pixel.

In an embodiment, the quantum imaging device may include a filter provided between the first photon pair generation part and the first beam splitter.

In an embodiment, the first beam splitter may include a polarization beam splitter.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Embodiments of the inventive concept will now be described in detail with reference to the accompanying drawings. Advantages and features of the present invention, and implementation methods thereof will be clarified through following embodiments described with reference to the accompanying drawings. However, the inventive concept may be embodied in different forms and should not be construed as limited to the embodiments set forth herein. Rather, these embodiments are provided so that this disclosure will be thorough and complete, and will fully convey the inventive concept to those skilled in the art, and the present invention is only defined by the scope of the claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "includes", "including", "comprises", and/or "comprising", when used 'in this description, specify the presence of stated elements, operations, and/or components, but do not preclude the presence or addition of one or more other elements, operations, and/or components. Furthermore, reference numerals, which are presented in the order of description, are provided according to the embodiments and are thus not necessarily limited to the order.

The embodiments of the inventive concept will be described with reference to example cross-sectional views and/or plan views. In the drawings, the dimensions of layers and regions are exaggerated for clarity of illustration. Therefore, the forms of the example drawings may be changed due to a manufacturing technology and/or error tolerance. Therefore, the embodiments of the inventive concept may involve changes of shapes depending on a manufacturing process, without being limited to the illustrated specific forms.

Figure 1:
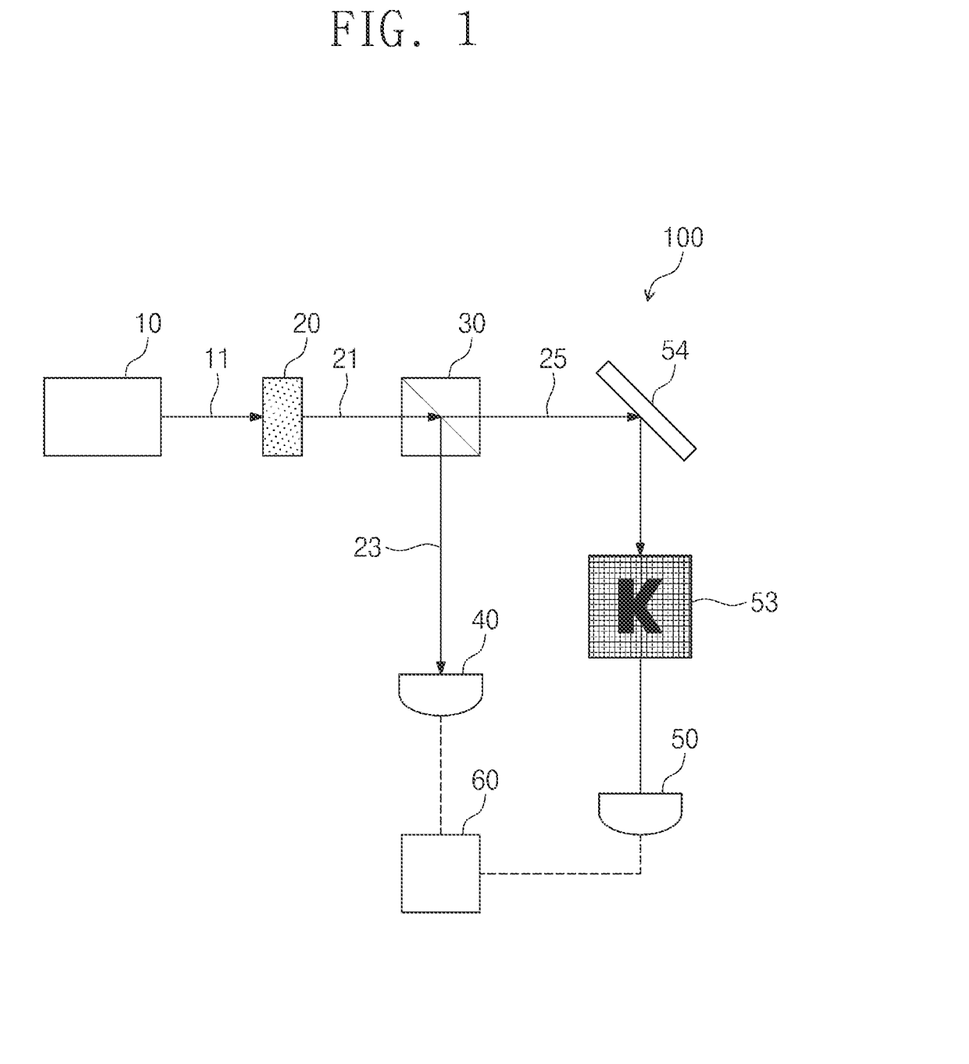
FIG. 1 is a diagram illustrating an example of a quantum imaging device according to the inventive concept.
Figure 2:
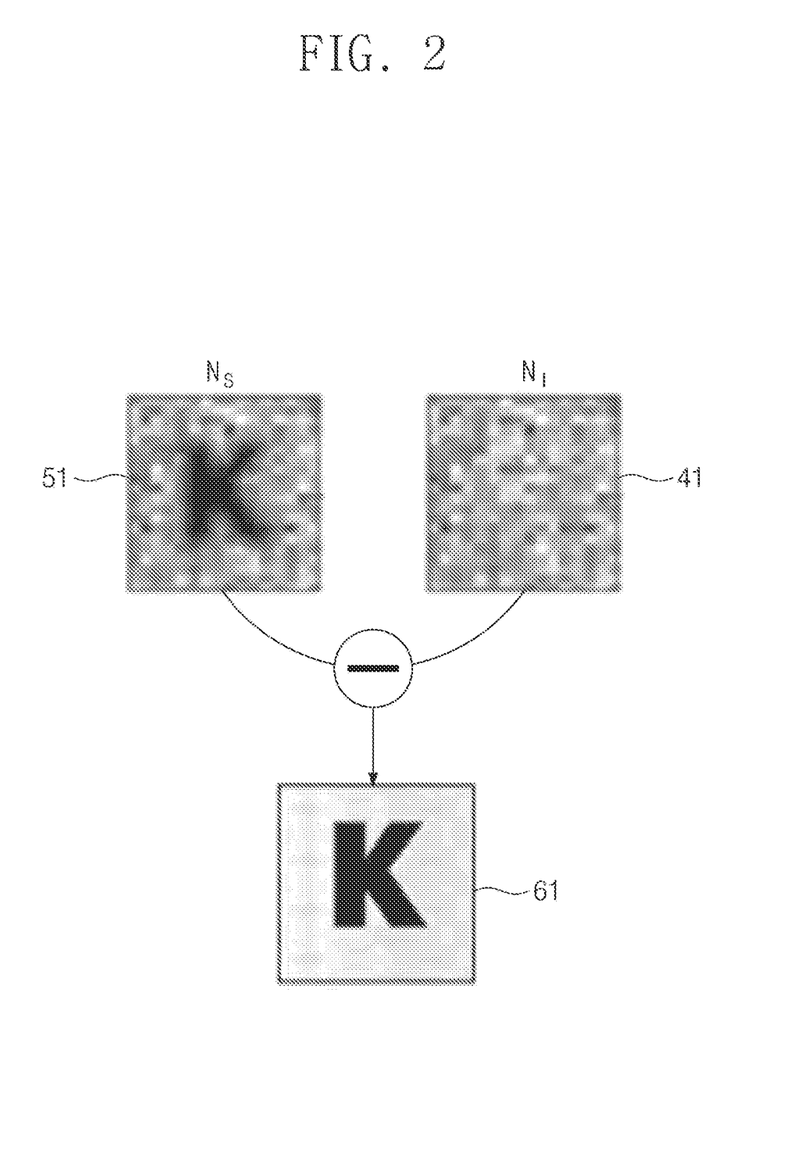
FIG. 2 is a diagram illustrating an example of a target image obtained by the signal processor of FIG. 1.

FIG. 1 illustrates an example of a quantum imaging device 100 according to the inventive concept. FIG. 2 illustrates an example of a target image 61 obtained by the signal processor 60 of FIG. 1.

Referring to FIGS. 1 and 2, the quantum imaging device 100 of an embodiment of the inventive concept may include a first light source 10, a first photon pair generation part 20, a first beam splitter 30, a first detector 40, a second detector 50, and the signal processor 60.

The first light source 10 may generate first light 11. The first light 11 may include laser light.

The first photon pair generation part 20 may be provided adjacent to the first light source 10. The first photon pair generation part 20 may generate a first entangled photon pair 21 using the first light 11. The first entangled photon pair 21 may have a single-peak wavelength. According to an example, the first photon pair generation part 20 may include a nonlinear crystal plate. For example, the first photon pair generation part 20 may include beta barium borate (BBO), periodically poled potassium titanyl phosphate (PPKTP), and periodically poled lithium niobate (PPLN). Alternatively, the first photon pair generation part 20 may include silicon (Si), silicon nitride (SiN), aluminum gallium arsenide (AlGaAs), or silicon carbide (SiC), but an embodiment of the inventive concept is not limited thereto. Although not illustrated, the first photon pair generation part 20 may further include a filter for eliminating noise of the first entangled photon pair 21.

The first beam splitter 30 may be provided adjacent to the first photon pair generation part 20. The first beam splitter 30 may separate the first entangled photon pair 21 into a first signal idler 23 and a first signal line 25. The first signal idler 23 may be reference light, and the first signal line 25 may be measurement light. For example, the first beam splitter 30 may include a polarization beam splitter.

The first detector 40 may be provided between the first beam splitter 30 and the signal processor 60. For example, the first detector 40 may include a low-priced single pixel. The first detector 40 may measure the number of photons of the first signal idler 23. Furthermore, the first detector 40 may receive the first signal idler 23 and obtain a detection signal of a reference image 41.

A total reflection mirror 54 may be provided between the first beam splitter 30 and the second detector 50. The total reflection mirror 54 may reflect the first signal line 25 to a target 53. The first signal line 25 may be radiated to the target 53. The target 53 may be an object to be measured. A portion of the first signal line 25 may be blocked by the target 53, and another portion of the first signal line 25 outside the target 53 may be provided to the second detector 50.

The second detector 50 may be provided between the target 53 and the signal processor 60. The second detector 50 may be the same as the first detector 40. For example, the second detector 50 may include a low-priced single pixel. The second detector 50 may measure the number of photons of the first signal line 25. The second detector 50 may receive the first signal line 25 and obtain a detection signal of a measurement image 51.

The signal processor 60 may be connected to the first detector 40 and the second detector 50. The signal processor 60 may obtain the reference image 41 using the detection signal of the first signal idler 23. The signal processor 60 may obtain the measurement image 51 using the detection signal of the first signal line 25. The signal processor 60 may obtain a target image 61 by comparing the reference image 41 with the measurement image 51. The target image 61 may be displayed by subtracting the reference image 41 from the measurement image 51. That is, the reference image 41 may correspond to a background image of the measurement image 51.

Figure 3:
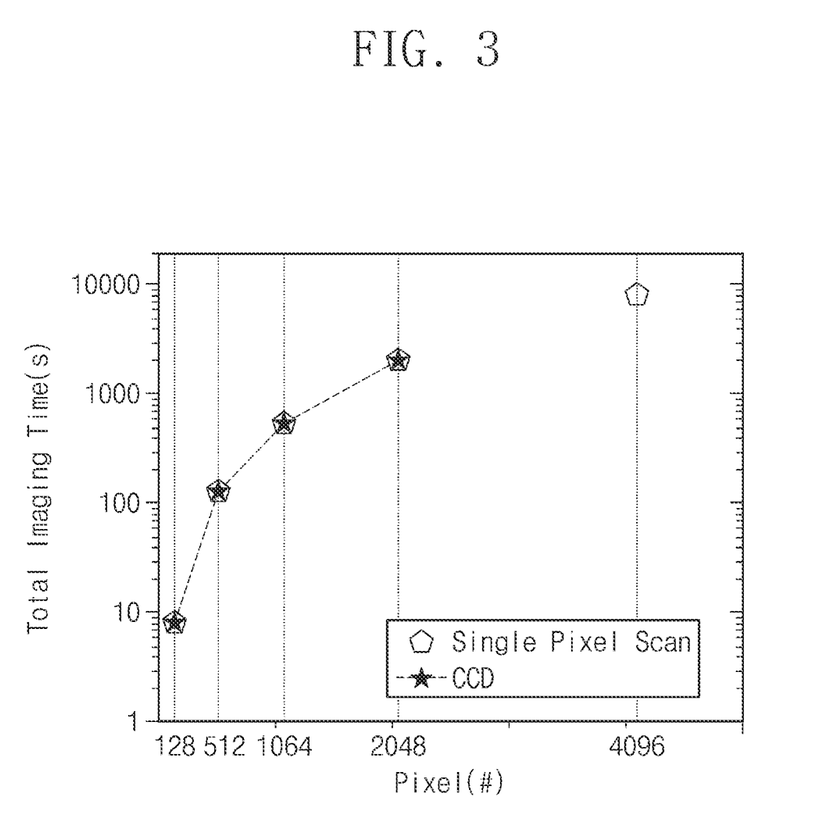
FIG. 3 is a graph illustrating a total imaging time of the first detector and second detector of FIG. 1 that are low-priced single-pixel detectors in comparison with a total imaging time of a high-priced CCD array.

FIG. 3 illustrates a total imaging time of the first detector 40 and second detector 50 of FIG. 1 that are low-priced single-pixel detectors in comparison with a total imaging time of a high-priced CCD array.

Referring to FIG. 3, the first detector 40 and the second detector 50 that are low-priced single-pixel detectors may have the same total imaging time as the total imaging time of the number of pixels of the high-priced CCD array. That is, the low-priced first detector 40 and second detector 50 may have the same performance as the high-priced CCD array.

Therefore, the quantum imaging device 100 of an embodiment of the inventive concept may increase productivity using the first photon pair generation part 20 and the low-priced single-pixel first detector 40 and second detector 50.

Figure 4:
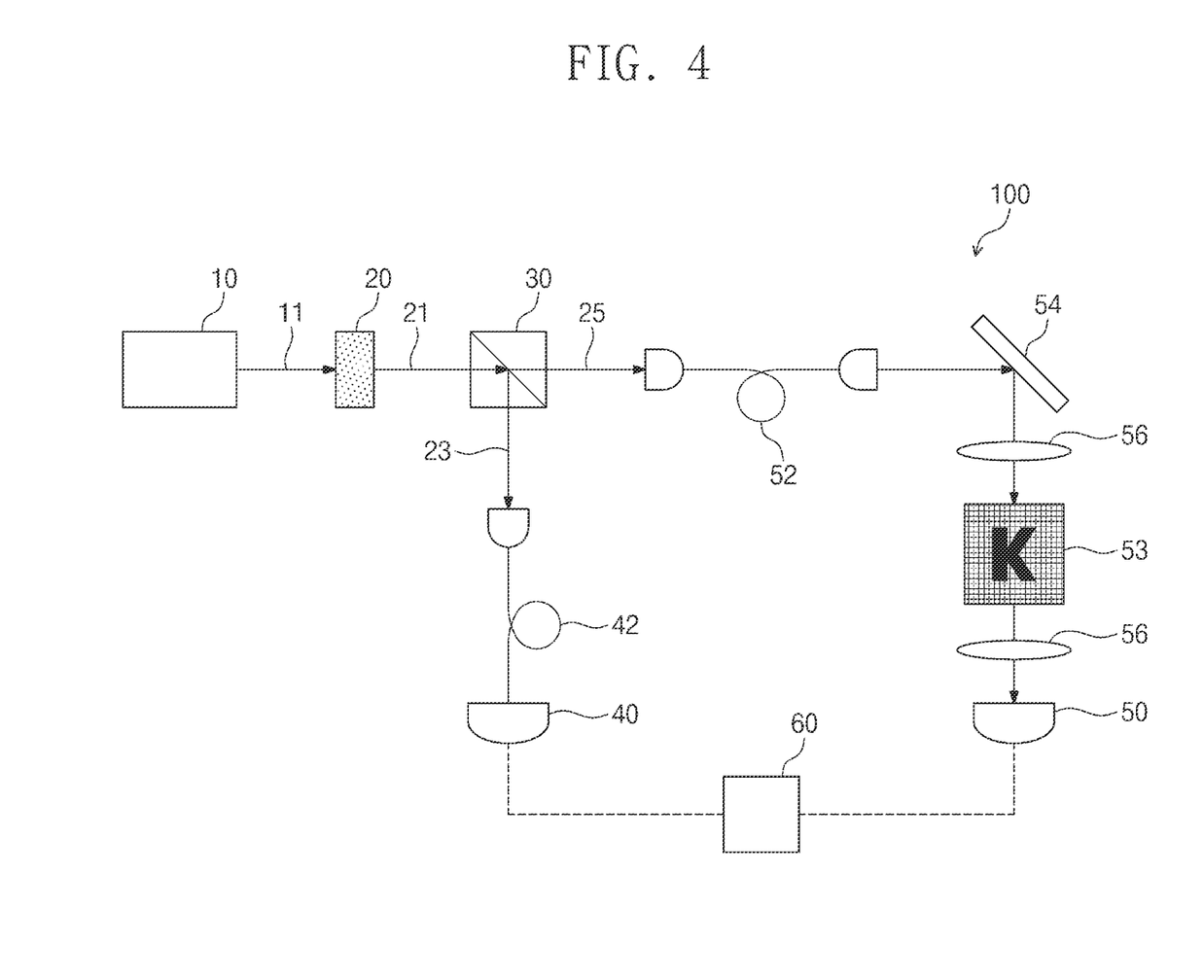
FIG. 4 is a diagram illustrating an example of a quantum imaging device according to the inventive concept.

FIG. 4 illustrates an example of the quantum imaging device 100 according to the inventive concept.

Referring to FIG. 4, the quantum imaging device 100 of an embodiment of the inventive concept may further include a first optical fiber 42 and a second optical fiber 52.

The first optical fiber 42 may be provided between the first beam splitter 30 and the first detector 40. The first optical fiber 42 may focus the first signal idler 23 on the first detector 40.

The second optical fiber 52 may be provided between the first beam splitter 30 and the total reflection mirror 54. The second optical fiber 52 may focus the first signal line 25 on the total reflection mirror 54 and the target 53. Projection lenses 56 may be provided on two sides of the target 53. The projection lenses 56 may collimate or focus the first signal line 25.

The first light source 10, the first photon pair generation part 20, the first beam splitter 30, the first detector 40, the second detector 50, and the signal processor 60 may be configured in the same manner as illustrated in FIG. 1.

Figure 5:
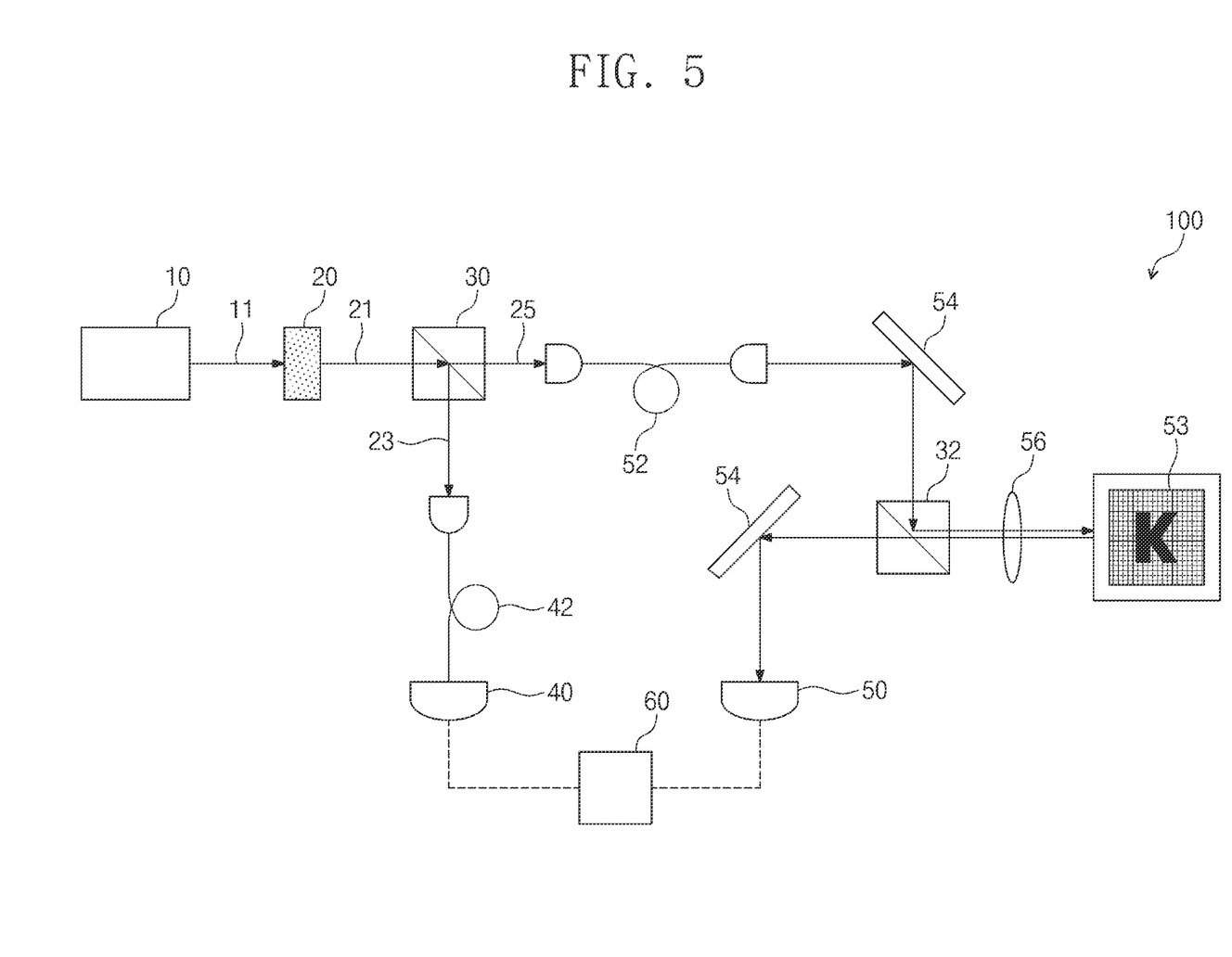
FIG. 5 is a diagram illustrating an example of a quantum imaging device according to the inventive concept.

FIG. 5 illustrates an example of the quantum imaging device 100 according to the inventive concept.

Referring to FIG. 5, the quantum imaging device 100 of an embodiment of the inventive concept may further include a second beam splitter 32.

The second beam splitter 32 may be provided between the total reflection mirror 54 and the second detector 50. The second beam splitter 32 may be provided adjacent to the target 53. The second beam splitter 32 may provide the first signal line 25 to the target 53, and provide the first signal line 25 reflected from the target 53 to the total reflection mirror 54 and the second detector 50. The projection lens 56 may focus the first signal line 25 on the target 53 and collimate the first signal line 25 to the second beam splitter 32. The first signal line 25 may have or include optical information of the target 53. That is, the second beam splitter 32 may provide, to the second detector 50, the first signal line 25 reflected to the target 53.

The first light source 10, the first photon pair generation part 20, the first beam splitter 30, the first detector 40, the second detector 50, and the signal processor 60 may be configured in the same manner as illustrated in FIGS. 1 and 4.

Figure 6:
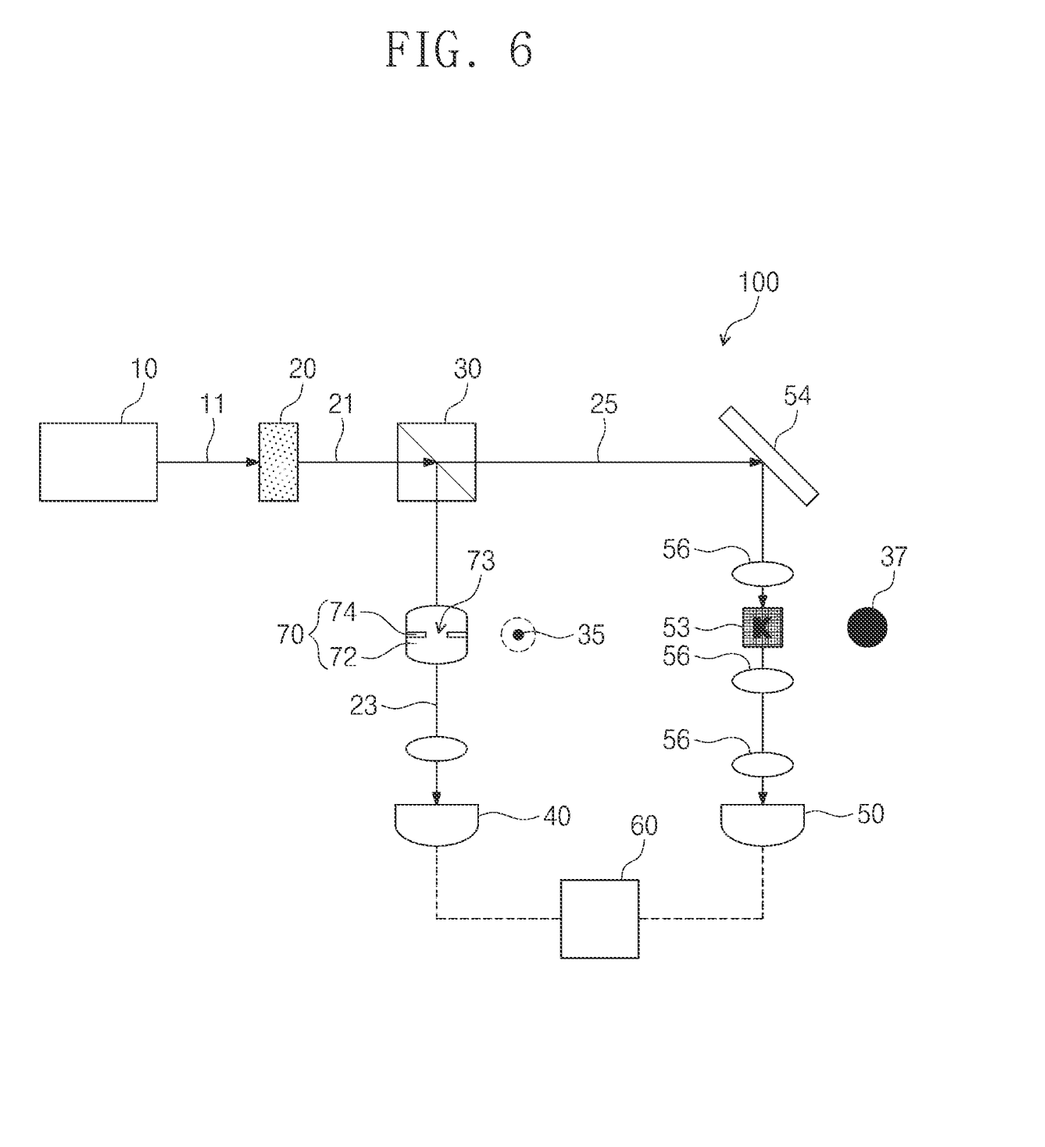
FIG. 6 is a diagram illustrating an example of a quantum imaging device according to the inventive concept.

FIG. 6 illustrates an example of a quantum imaging device 100 according to the inventive concept.

Referring to FIG. 6, the quantum imaging device 100 of an embodiment of the inventive concept may further include a pinhole lens 70.

The pinhole lens 70 may be provided between the first beam splitter 30 and the first detector 40. The pinhole lens 70 may determine a first beam size 35 of the first signal idler 23. The first beam size 35 may be equal to or less than a second beam size 37 of the first signal line 25. The pinhole lens 70 may increase resolution of imaging processing by reducing the first beam size 35. The pinhole lens 70 may increase the resolution by locally displaying the reference image 41, the measurement image 51, and the target image 61 only on a portion corresponding to the first beam size 35.

According to an example, the pinhole lens 70 may include a convex lens 72 and a diaphragm 74. The convex lens 72 may surround the diaphragm 74. The diaphragm 74 may be provided within the convex lens 72. The diaphragm 74 may have an aperture 73. The aperture 73 may determine or define the first beam size 35 of the first signal idler 23.

Figure 7:
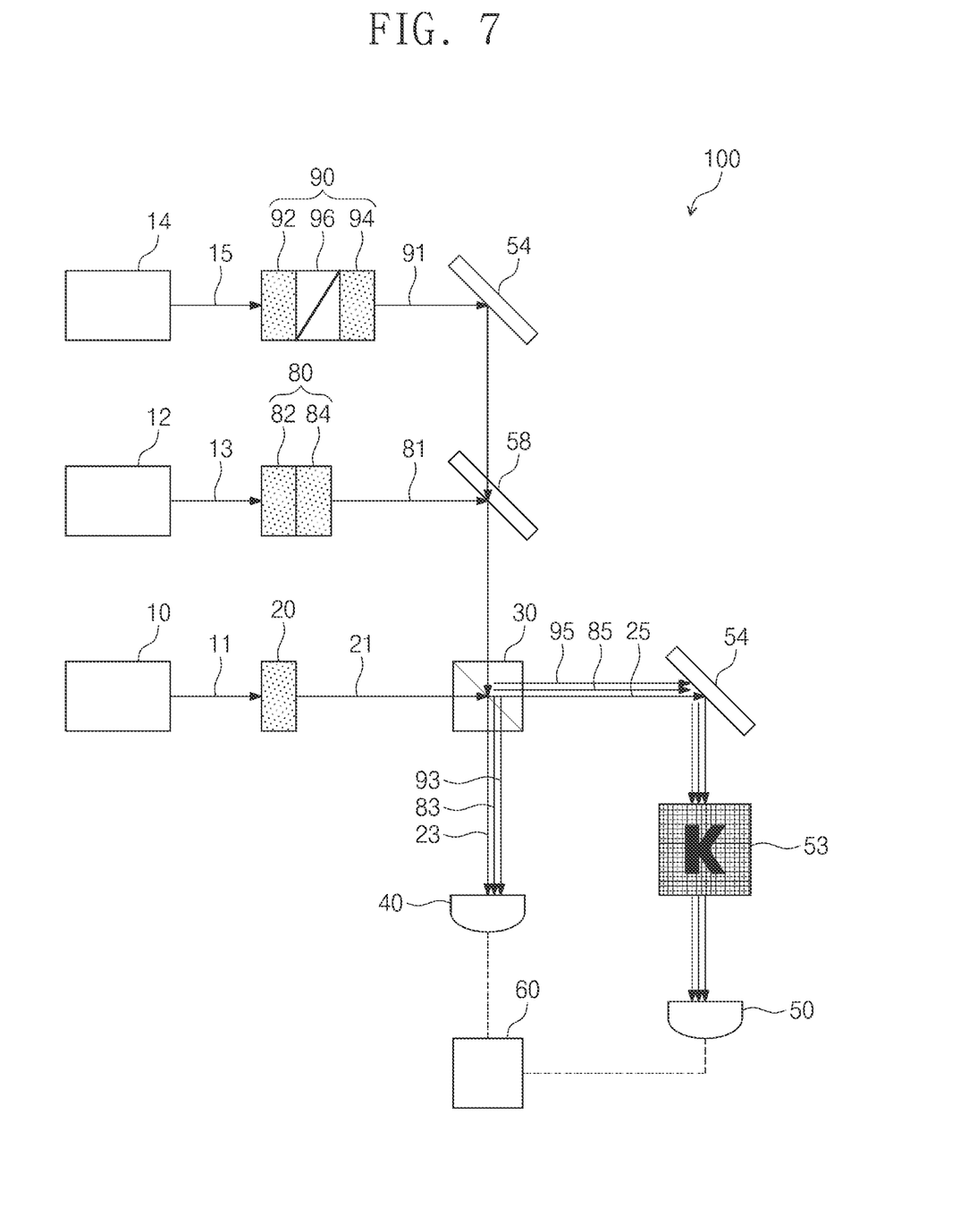
FIG. 7 is a diagram illustrating an example of a quantum imaging device according to the inventive concept.

FIG. 7 illustrates an example of a quantum imaging device 100 according to the inventive concept.

Referring to FIG. 7, the quantum imaging device 100 of an embodiment of the inventive concept may further include a second light source 12, a second photon pair generation part 80, a third light source 14, and a third photon pair generation part 90.

The second light source 12 may generate second light 13. The second light 13 may be the same as the first light 11. The second light 13 may include laser light.

The second photon pair generation part 80 may be provided adjacent to the second light source 12. The second photon pair generation part 80 may generate a second entangled photon pair 81 using the second light 13. The second entangled photon pair 81 may have a wider wavelength bandwidth than a wavelength bandwidth of the first entangled photon pair 21. When the first entangled photon pair 21 has a wavelength bandwidth of about 100 nm, the second entangled photon pair 81 may have a wavelength bandwidth of about 200 nm. The first entangled photon pair 21 may have a narrow bandwidth, and the second entangled photon pair 81 may have a middle bandwidth. The second photon pair generation part 80 may be different from the first photon pair generation part 20. For example, the second photon pair generation part 80 may be thicker than the first photon pair generation part 20. According to an example, the second photon pair generation part 80 may include a first nonlinear crystal plate 82 and a second nonlinear crystal plate 84.

The first nonlinear crystal plate 82 may be the same as the first photon pair generation part 20. For example, the first nonlinear crystal plate 82 may have the same thickness as that of the first photon pair generation part 20.

The second nonlinear crystal plate 84 may be in contact with the first nonlinear crystal plate 82. The second nonlinear crystal plate 84 may have the same thickness as that of the first nonlinear crystal plate 82. The first nonlinear crystal plate 82 and the second nonlinear crystal plate 84 each may include beta barium borate (BBO), periodically poled potassium titanyl phosphate (PPKTP), and periodically poled lithium niobate (PPLN). Alternatively, the first nonlinear crystal plate 82 and the second nonlinear crystal plate 84 each may include silicon (Si), silicon nitride (SiN), aluminum gallium arsenide (AlGaAs), or silicon carbide (SiC), but an embodiment of the inventive concept is not limited thereto.

A dichroic mirror 58 may be provided between the second nonlinear crystal plate 84 and the first beam splitter 30. The dichroic mirror 58 may reflect the second entangled photon pair 81 to the first beam splitter 30.

The first beam splitter 30 may separate the second entangled photon pair 81 into a second signal idler 83 and a second signal line 85.

The first detector 40 may detect the second signal idler 83. The total reflection mirror 54 may provide the second signal line 85 to the target 53 and the second detector 50.

The second detector 50 may detect the second signal line 85.

The signal processor 60 may detect the reference image 41 using a detection signal of the second signal line 85. The second signal line 85 may display defects of more various sizes than the first signal line 25 in the reference image 41. That is, the second entangled photon pair 81 may generate the target image 61 of a middle band of a wider wavelength than the first entangled photon pair 21.

Referring to FIG. 7, the third light source 14 may generate third light 15. The third light 15 may be the same as the first light 11 and the second light 13. The third light 15 may include laser light.

The third photon pair generation part 90 may be provided adjacent to the third light source 14. The third photon pair generation part 90 may generate a third entangled photon pair 91 using the third light 15. The third entangled photon pair 91 may have a wider wavelength bandwidth than the wavelength bandwidths of the first entangled photon pair 21 and the second entangled photon pair 81. The third entangled photon pair 91 may have a wavelength bandwidth of about 300 nm or more. The third entangled photon pair 91 may have a wide bandwidth. The third photon pair generation part 90 may be different from the first photon pair generation part 20 and the second photon pair generation part 80. For example, the third photon pair generation part 90 may be thicker than the second photon pair generation part 80. According to an example, the third photon pair generation part 90 may include a third nonlinear crystal plate 92, a fourth nonlinear crystal plate 94, and a birefringent material plate 96.

The third nonlinear crystal plate 92 may be provided on one side of the birefringent material plate 96. The third nonlinear crystal plate 92 may be the same as the first photon pair generation part 20, the first nonlinear crystal plate 82, and the second nonlinear crystal plate 84. For example, the third nonlinear crystal plate 92 may have the same thickness as the thicknesses of the first photon pair generation part 20, the first nonlinear crystal plate 82, and the second nonlinear crystal plate 84.

The fourth nonlinear crystal plate 94 may be provided on the other side of the birefringent material plate 96. The fourth nonlinear crystal plate 94 may have the same thickness as that of the third nonlinear crystal plate 92. The third nonlinear crystal plate 92 and the fourth nonlinear crystal plate 94 each may include beta barium borate (BBO), periodically poled potassium titanyl phosphate (PPKTP), and periodically poled lithium niobate (PPLN). Alternatively, the third nonlinear crystal plate 92 and the fourth nonlinear crystal plate 94 each may include silicon (Si), silicon nitride (SiN), aluminum gallium arsenide (AlGaAs), or silicon carbide (SiC), but an embodiment of the inventive concept is not limited thereto.

The total reflection mirror 54 may be provided between the fourth nonlinear crystal plate 94 and the dichroic mirror 58. The total reflection mirror 54 may reflect the third entangled photon pair 91 to the dichroic mirror 58. The dichroic mirror 58 may reflect the third entangled photon pair 91 to the first beam splitter 30.

The first beam splitter 30 may separate the third entangled photon pair 91 into a third signal idler 93 and a third signal line 95.

The second detector 50 may detect the third signal idler 93. The total reflection mirror 54 may provide the third signal line 95 to the target 53 and the second detector 50.

The second detector 50 may detect the third signal line 95.

The signal processor 60 may detect the reference image 41 using a detection signal of the third signal line 95. The third signal line 95 may display defects of more various sizes than the first signal line 25 and the second signal line 85 in the reference image 41. That is, the third entangled photon pair 91 may generate the target image 61 of a wide band of a wider wavelength than the first entangled photon pair 21 and the second entangled photon pair 81.

Therefore, the quantum imaging device 100 of an embodiment of the inventive concept may obtain the target images 61 of a narrow band, middle band, and wide band using the first entangled photon pair 21, the second entangled photon pair 81, and the third entangled photon pair 91 of the first photon pair generation part 20, the second photon pair generation part 80, and the third photon pair generation part 90.

The quantum imaging device according to an embodiment of the inventive concept may increase the productivity by obtaining a target image using a first photon pair generation part and low-priced single-pixel first and second detectors.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A quantum imaging device comprising:
    first and second light sources configured to generate first and second light;
    a first photon pair generation part configured to generate a first entangled photon pair using the first light;
    a second photo pair generation part configured to generate a second entangled photon pair having a wider wavelength band width than a wavelength band width of the first entangled photon pair using the second light;
    a first beam splitter configured to separate the first and second entangled photon pairs into first and second signal idlers, and a first and second signal lines;
    a first detector configured to receive the first and second signal idlers and generate a reference image;
    a first mirror configured to provide the first and second signal lines to a target;

a second detector configured to receive the first and second signal lines transmitted or reflected to the target and generate a measurement image; and a signal processor connected to the first and second detectors and configured to obtain a target image by comparing the measurement image with the reference image, wherein the first photon pair generation part has a first thickness, and wherein the second photon pair generation part has a second thickness greater than the first thickness to broaden the wavelength band width of the second entangled photon beyond the wavelength band width of the first entangled photon pair.

2. The quantum imaging device of claim 1, wherein the first photon pair generation part includes a nonlinear crystal plate.

3. The quantum imaging device of claim 1, further comprising:
a first optical fiber between the first beam splitter and the first detector; and
a second optical fiber between the first beam splitter and the first mirror.

4. The quantum imaging device of claim 1, further comprising a second beam splitter between the first mirror and the second detector.

5. The quantum imaging device of claim 1, further comprising a pinhole lens between the first beam splitter and the first detector.

6. The quantum imaging device of claim 1, wherein the second photon pair generation part includes:
a first nonlinear crystal plate; and
a second nonlinear crystal plate in contact with the first nonlinear crystal plate.

7. The quantum imaging device of claim 1, further comprising:
a third light source configured to generate third light; and
a third photon pair generation part configured to generate a third entangled photon pair using the third light, the third photon pair generation part being thicker than the second photon pair generation part.

8. The quantum imaging device of claim 7, wherein the third photon pair generation part includes:
a third nonlinear crystal plate;
a fourth nonlinear crystal plate spaced apart from the third nonlinear crystal plate; and
a birefringent material plate between the third and fourth nonlinear crystal plates.

9. The quantum imaging device of claim 7, further comprising a dichroic mirror provided between the first beam splitter and the second and third photon pair generation parts, the dichroic mirror reflecting the second entangled photon pair to the first beam splitter and transmitting the third entangled photon pair.

10. A quantum imaging device comprising:
first and second light sources configured to generate first and second light;
a first photon pair generation part configured to generate a first entangled photon pair using the first light;
a second photo pair generation part thicker than the first photon pair generation part and configured to generate a second entangled photon pair having a wider band than a band of the first entangled photon pair using the second light;
a first beam splitter configured to separate the first and second entangled photon pairs into first and second signal idlers and first and second signal lines;
a first detector configured to receive the first and second signal idlers and generate a reference image;
a first mirror configured to provide the first and second signal lines to a target;
a second detector configured to receive the first and second signal lines transmitted or reflected to the target and generate a measurement image; and
a signal processor connected to the first and second detectors and configured to obtain a target image by comparing the measurement image with the reference image, wherein the first photon pair generation part has a first thickness, and wherein the second photon pair generation part has a second thickness greater than the first thickness to broaden the band of the second entangled photon beyond the band of the first entangled photon pair.

11. The quantum imaging device of claim 10, wherein the first photon pair generation part includes a nonlinear crystal plate.

12. The quantum imaging device of claim 10, wherein the second photon pair generation part includes:
a first nonlinear crystal plate having a same thickness as the first thickness; and
a second nonlinear crystal plate in contact with the first nonlinear crystal plate and having a same thickness as the thickness of the first nonlinear crystal plate.

13. The quantum imaging device of claim 10, further comprising:
a third light source configured to generate third light; and
a third photon pair generation part configured to generate a third entangled photon pair having a wider band than the band of the second entangled photo pair using the third light.

14. The quantum imaging device of claim 13, wherein the third photon pair generation part includes:
a third nonlinear crystal plate having a same thickness as the first thickness;
a fourth nonlinear crystal plate arranged spaced apart from the third nonlinear crystal plate and having a same thickness as the thickness of the third nonlinear crystal plate; and
a birefringent material plate provided between the third and fourth nonlinear crystal plates.

15. The quantum imaging device of claim 13, further comprising a total reflection mirror provided between the third photon pair generation part and the first beam splitter.

16. The quantum imaging device of claim 15, further comprising a dichroic mirror, which is provided between the total reflection mirror and the first beam splitter, reflects the second entangled photon pair to the first beam splitter, and transmits the third entangled photon pair to the first beam splitter.

17. The quantum imaging device of claim 10, wherein the first and second detectors each have a single pixel.

18. The quantum imaging device of claim 10, further comprising a filter provided between the first photon pair generation part and the first beam splitter.

19. The quantum imaging device of claim 10, wherein the first beam splitter includes a polarization beam splitter.

* * * * *